US008518248B2

(12) United States Patent
Ishii et al.

(10) Patent No.: US 8,518,248 B2
(45) Date of Patent: Aug. 27, 2013

(54) OIL STRAINER WITH STRUCTURE FOR PREVENTING AIR ACCUMULATION

(75) Inventors: Hideki Ishii, Numazu (JP); Masaru Shimada, Shizuoka (JP); Hideki Nakazawa, Fuji (JP)

(73) Assignee: Jatco Ltd, Fuji-shi (JP)

( * ) Notice: Subject to any disclaimer, the term of this patent is extended or adjusted under 35 U.S.C. 154(b) by 358 days.

(21) Appl. No.: 12/947,394

(22) Filed: Nov. 16, 2010

(65) Prior Publication Data

US 2011/0120933 A1 May 26, 2011

(30) Foreign Application Priority Data

Nov. 26, 2009 (JP) .................. 2009-268402

(51) Int. Cl.
*B01D 21/24* (2006.01)
*B01D 27/00* (2006.01)
*B01D 27/10* (2006.01)
*F02M 37/00* (2006.01)

(52) U.S. Cl.
USPC .......... 210/109; 210/167.08; 210/167.02; 210/416.4; 210/416.5; 210/130; 210/435; 180/337; 180/338; 123/510; 123/514; 123/196 A

(58) Field of Classification Search
USPC ............. 210/109, 167.08, 112, 117, 137, 210/167.01, 167.02, 195.1, 252, 416.4, 416.5, 210/130, 435, 451, 455; 180/337, 338; 123/197.1, 510, 514, 196 A, 196 S
See application file for complete search history.

(56) References Cited

U.S. PATENT DOCUMENTS

| | | | | |
|---|---|---|---|---|
| 5,901,802 A | * | 5/1999 | Sunohara et al. | 180/65.6 |
| 2009/0045129 A1 | * | 2/2009 | Jinbo et al. | 210/416.5 |
| 2009/0127174 A1 | * | 5/2009 | Shinbori et al. | 210/167.08 |

FOREIGN PATENT DOCUMENTS

| | | |
|---|---|---|
| EP | 1 825 897 A2 | 8/2007 |
| EP | 2 014 955 A1 | 1/2009 |
| EP | 2 055 364 A2 | 5/2009 |
| JP | 04-015354 A | 1/1992 |

* cited by examiner

*Primary Examiner* — Nam Nguyen
*Assistant Examiner* — Richard Gurtowski
(74) *Attorney, Agent, or Firm* — Foley & Lardner LLP

(57) ABSTRACT

An oil strainer includes a body member which includes a circumferential wall projecting in a first (downward) direction toward an oil pan, and a cover member covering an inside space surrounded by the circumferential wall, and including a suction hole to suck an oil from the oil pan. The body member further includes a communication hole opened into the inside space surrounded by the circumferential wall and adapted to lead to the inlet side of an oil pump, and a discharge hole opened into the inside spaces, and adapted to receive the oil discharged from a pressure regulating valve. The body member further includes a partition wall extending from the circumferential wall, and separating the communication hole and the discharge hole.

10 Claims, 4 Drawing Sheets

OIL STRAINER WITH STRUCTURE FOR PREVENTING AIR ACCUMULATION

BACKGROUND OF THE INVENTION

The present invention relates to an oil strainer and more specifically to an air accumulation preventing structure for an oil strainer.

In an automatic transmission for a vehicle, a control valve body including an oil pressure control circuit is disposed in an oil pan covering a lower opening of a transmission case. The oil pan is arranged to recover and store an oil used for lubrication and operation in a transmission mechanism. The oil in the oil pan is sucked through an oil strainer by an oil pump, and used again for the lubrication and operation of the transmission mechanism. The oil to be used for the operation of the transmission mechanism is supplied from the oil pump to the control valve body.

The oil pressure control circuit in the control valve body includes a pressure regulating valve (or regulator valve) for adjusting the discharge or outlet pressure of the oil pump to a predetermined pressure level, a spool valve for changing over connection among oil passages and a pressure regulating valve for controlling the pressure of the oil used for operating the transmission mechanism. The oil supplied from the oil pump to the control valve body is passed through the oil pressure control circuit for the pressure adjustment, and thereafter used for the operation which is engagement of friction engagement elements in the case of a step automatic transmission such as a transmission using a planetary gear system, and which is variation of a pulley width in the case of a continuously variable belt-type automatic transmission, for example.

The control valve body is provided with a discharge hole for the oil (drain oil) discharged from a pressure regulating valve. Ordinarily, the oil is discharged through this discharge hole into the oil pan.

A patent document 1 (JP 0415354A) shows an automatic transmission in which the discharge hole is formed in an oil strainer, and the oil discharged from the pressure regulating valve is discharged directly into the oil strainer.

SUMMARY OF THE INVENTION

However, the oil strainer as shown in the patent document 1 is liable to suffer an accumulation of air in a stagnant region where the motion of oil is slow, and to cause a shock due to the air accumulation conveyed to a frictional engagement device in a transmission mechanism.

According to one aspect of the present invention, an oil strainer comprises: a body member which is adapted to form a valve body provided with a pressure regulating valve to adjust an outlet pressure of an oil pump to a predetermined pressure level, and which includes a circumferential wall projecting in a first direction toward an oil pan; and a cover member covering an inside space surrounded by the circumferential wall, and including a suction hole (inlet port) to suck an oil from the oil pan. The oil strainer further comprises a communication hole (outlet port) opened into the inside space surrounded by the circumferential wall and adapted to be connected to an inlet passage of the oil pump, a discharge hole opened into the inside space surrounded by the circumferential wall, and adapted to receive the oil discharged from the pressure regulating valve, and a partition wall extending from the circumferential wall, and separating the communication hole and the discharge hole from each other.

DETAILED DESCRIPTION OF THE INVENTION

Figure 4A:
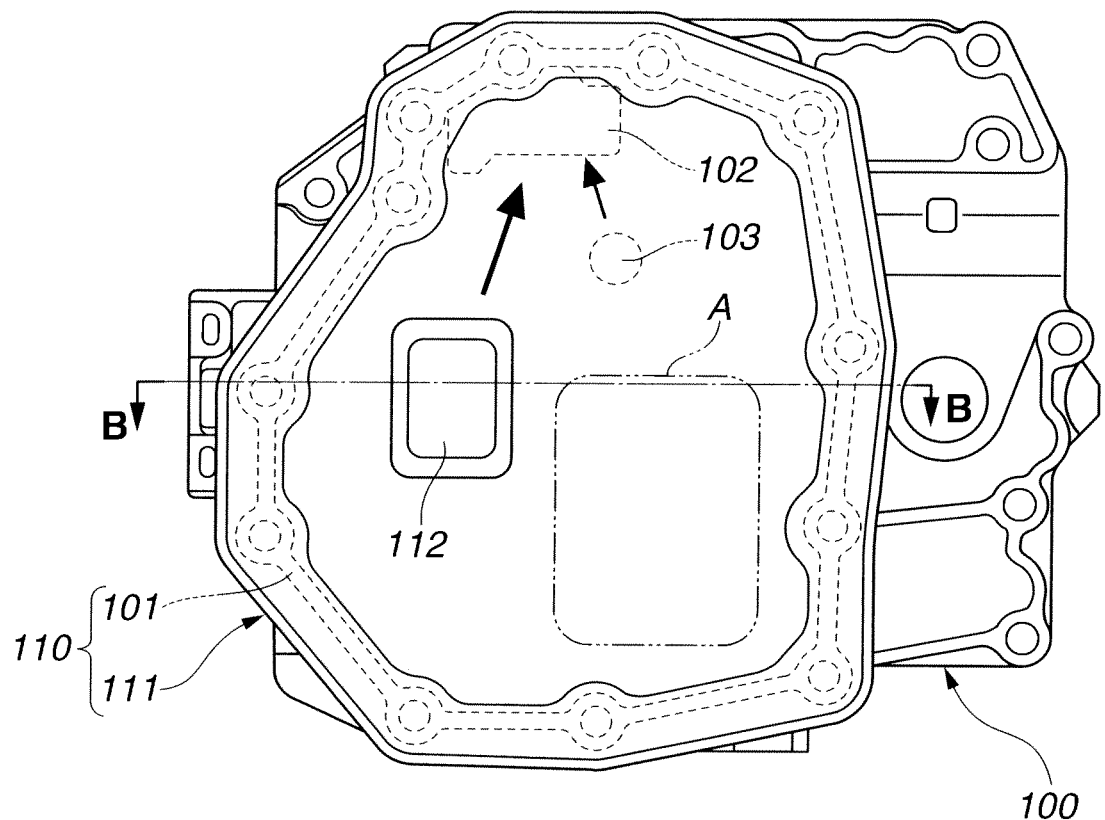
FIG. 4A is a plan view of an oil strainer of a comparable example as viewed from the oil pan's side.
Figure 4B:
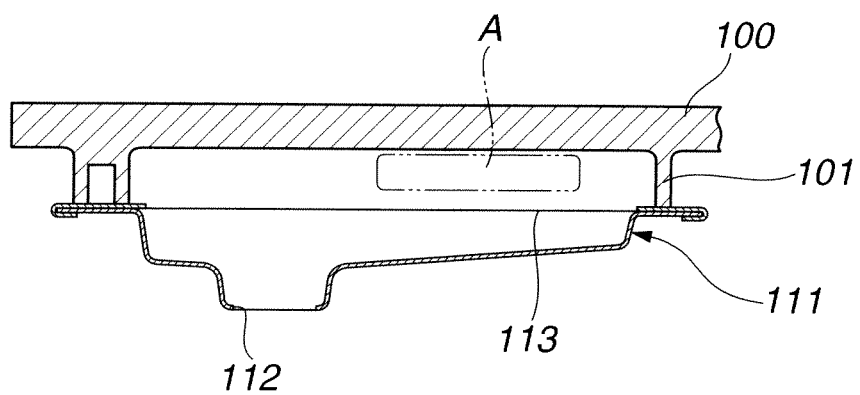
FIG. 4B is a sectional view taken across a line B-B shown in FIG. 4A.

FIG. 4 (4A and 4B) shows an oil strainer of a comparable example employing a structure disclosed in patent document 1. FIG. 4A shows, in a plan, an oil strainer 110 of the comparable example as viewed from below on an oil pan's side. FIG. 4B is a sectional view taken across a line B-B shown in FIG. 4A.

Oil strainer 110 is formed by a circumferential wall 101 projecting downwards from a lower body portion 100 of a control valve body, and a cover member 111 covering an opening of the circumferential wall 101. The lower body portion 100 is formed with a communication hole 102 (outlet port leading to an oil pump) and a discharge hole 103 which are opened into the inside space surrounded by circumferential wall 101. The communication hole 102 is connected with a suction passage (not shown) or an inlet side of an oil pump. The discharge hole 103 is a drain hole through which the oil is discharged from a pressure regulating valve in the control valve body. The cover member 111 is formed with a suction hole 112 (inlet port) for sucking the oil in an oil pan into oil strainer 110 at the time of oil pump operation.

In this oil strainer 110, the oil sucked from suction hole 112 is passed through a filter mesh member 113 to remove foreign substances, and thereafter drawn through communication hole 102 to the oil pump.

In the comparable example shown in FIGS. 4A and 4B, the discharge hole 103 is located near the communication hole 102, as shown in FIG. 4A. In this case, the oil discharged from discharge hole 103 and the oil sucked from suction hole 112 flow so as to form respective flows directly toward communication hole 102. Accordingly, on a remote side of the suction hole 112 remote from communication hole 102, there can be formed a stagnant region A, as shown in FIGS. 4A and 4B, in which the oil is stagnant.

Therefore, air in the form of minute air bubbles tends to gather in the stagnant region A and form an accumulation of air or air pocket.

When, in this state, the rotational speed of the oil pump is increased and the discharge quantity of the oil pump is increased, then the sucking force at communication hole 102 can be increased to such a level to suck air bubbles in the air accumulation into the oil pump. In this case, a lump of air could decrease the engagement pressure and cause a shock when supplied to a friction engagement device such as a clutch or a brake.

Figure 1:
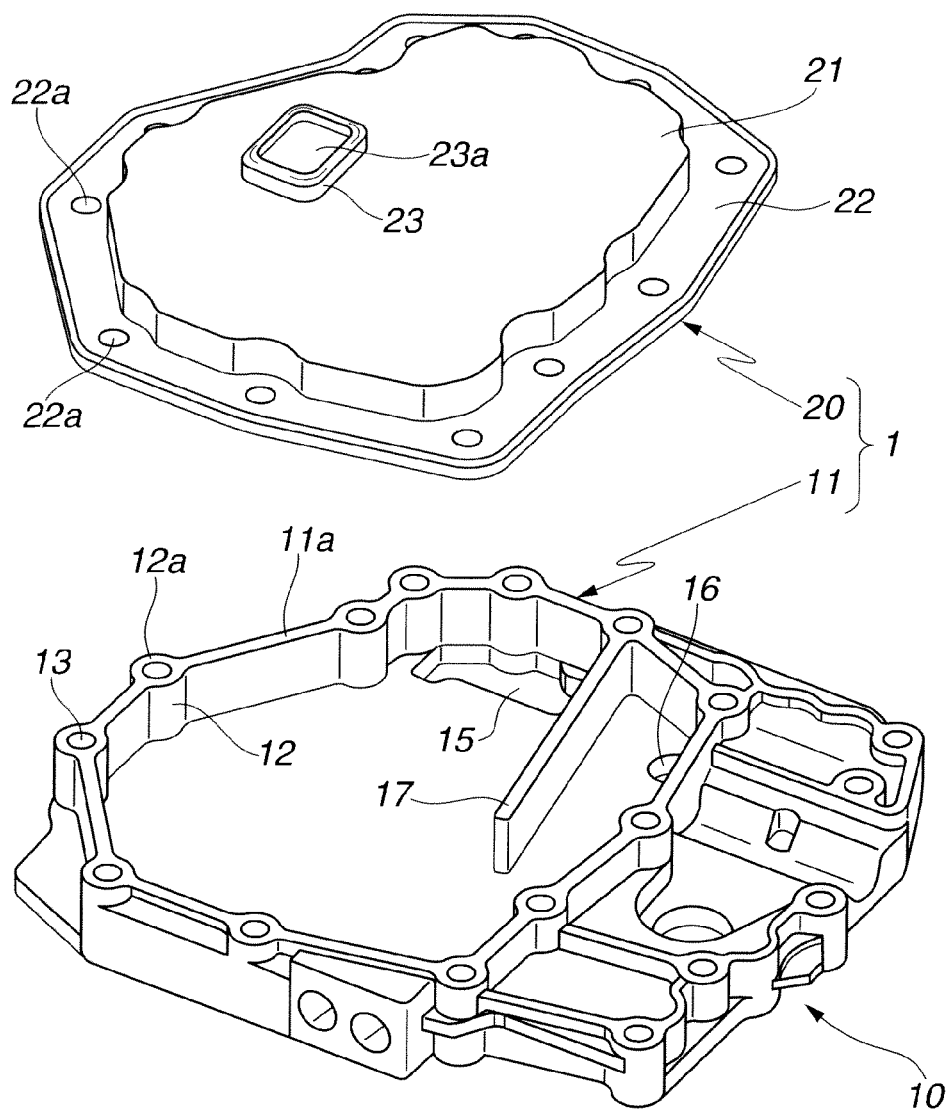
FIG. 1 is an exploded perspective view of an oil strainer according to one embodiment of the present invention.

FIG. 1 shows an oil strainer 1 according to an embodiment of the present invention which is designed to prevent or hinder formation of air accumulation in the oil strainer.

Figure 2:
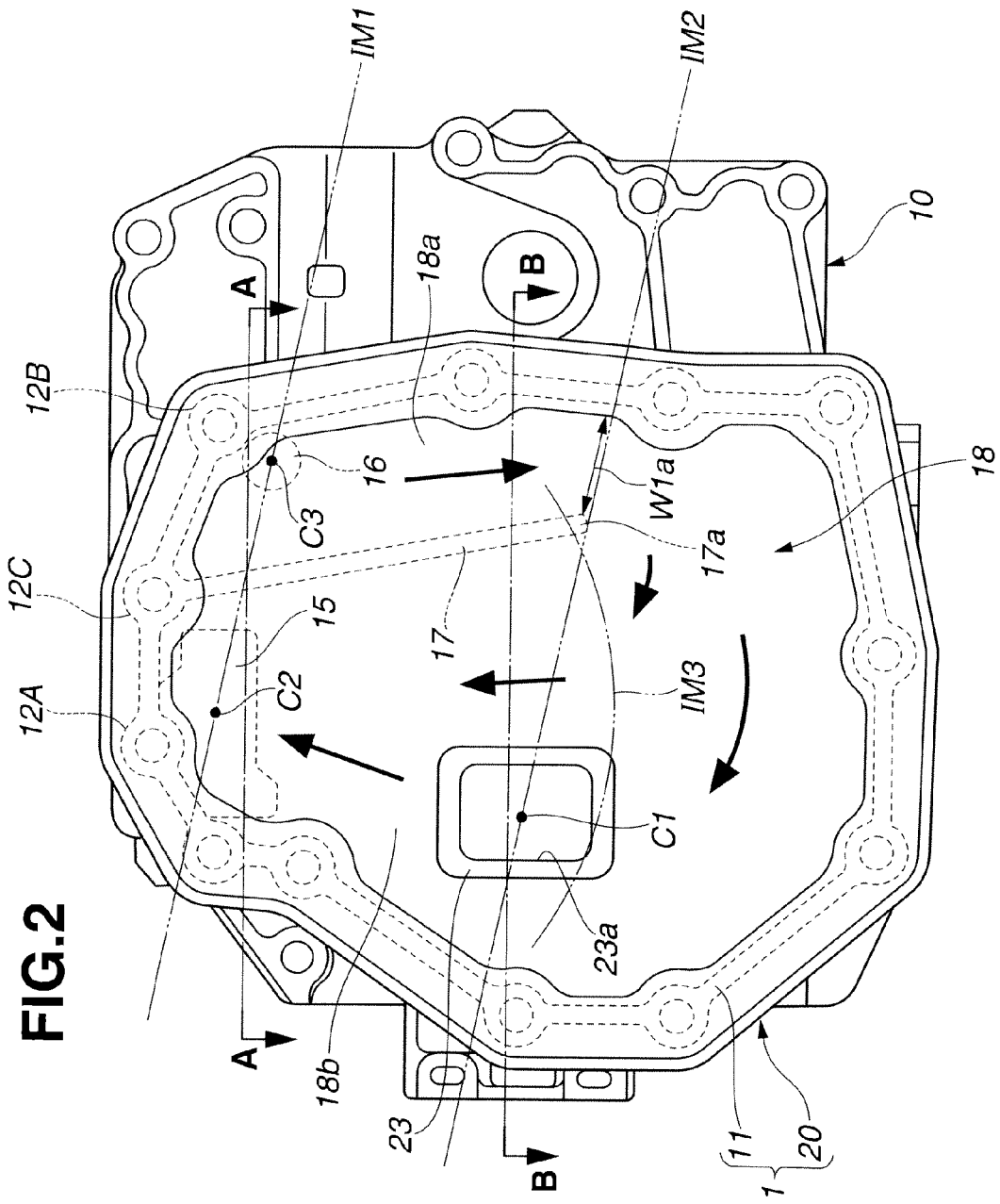
FIG. 2 is a plan view of the oil strainer of FIG. 1 as viewed from below, that is, from the oil pan's side.
Figure 3A:
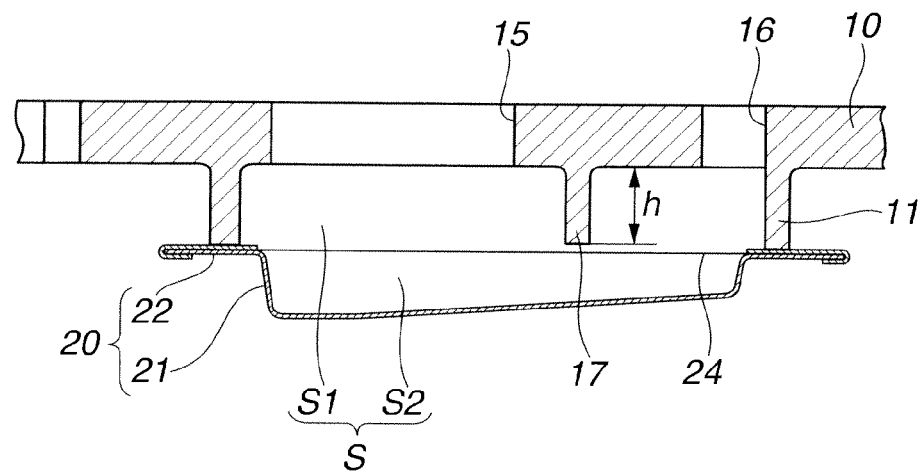
FIG. 3A is a sectional view taken across a line A-A in FIG. 2.
Figure 3B:
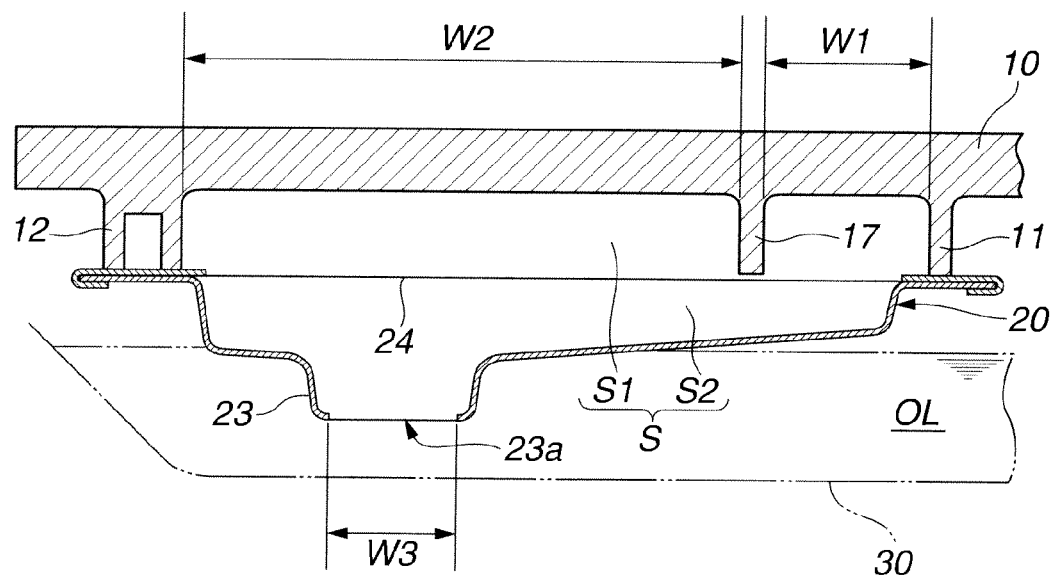
FIG. 3B is a sectional view taken across a line B-B in FIG. 2.

FIG. 1 shows the oil strainer 1 to be formed under a control valve body. In this example, the oil strainer 1 is formed at a (lower) body member 10 forming the control valve body. FIG. 1 is an exploded perspective view of the oil strainer 1 as viewed obliquely from a lower position on the oil pan's side. FIG. 2 is a plan view of the oil strainer 1 as viewed from the lower position on the oil pan's side. In FIG. 2, the inside of oil strainer 1 concealed by a cover member 20 is shown by broken lines to shown an oil passage 18 formed in oil strainer 1. FIG. 3A is a sectional view taken across a line A-A in FIG. 2, and FIG. 3B is a sectional view taken across a line B-B in FIG. 2.

As shown in FIG. 1, the oil strainer 1 is formed by covering and closing the opening of a circumferential wall 11 formed in the (lower) body member 10 of the control valve body, with the cover member 20.

The control valve body formed with oil grooves or oil passages includes a separator plate disposed between an upper body member and the body member 10 which is a lower body member in this example, and the control valve body encloses an oil pressure control circuit including a regulator valve (pressure regulating valve) for controlling the discharge pressure or pump outlet pressure of an oil pump to a predetermined pressure level, one or more oil passages, a spool valve (or directional control valve) for changing over the connection among the oil passages, and a pressure regulating valve for adjusting the pressure of the oil used for the operation of a transmission mechanism.

The lower body member 10 includes a base wall (lower or bottom wall) confronting an oil pan (30) and facing in a first direction which is a downward direction in the normal position of the oil strainer in the installed state. The base wall of body member 10 is formed with a communication hole 15 and a discharge hole 16. Communication hole 15 is a hole connected with the an intake passage (not shown) of the oil pump. Communication hole 15 serves as an outlet port adapted to be connected to an oil pump's side. Discharge hole 16 is a hole through which the oil (drain oil) discharged from the regulator valve is conveyed into the oil strainer 1. Communication hole 15 and discharge hole 16 are formed in the wall portion surrounded by the circumferential wall 11 projecting in the first (downward) direction toward the bottom of the oil pan (30), at respective positions near circumferential wall 11. Each of communication hole 15 and discharge hole 16 is adjacent to circumferential wall 11 in the illustrated example. Communication hole 15 and discharge hole 16 are located at the respective positions close to each other in a circumferential direction along the circumferential wall 11. Communication hole 15 is larger, in opening size, than discharge hole 16.

The regulator valve to be connected with discharge hole 16 is a valve located at a most upstream position closer to the oil pump in the control valve body. Therefore, the drain oil of the regulator valve is clean and free from foreign substances, as compared to the drain oils of the other pressure regulating valve and the spool valve. Therefore, the drain oil of the regulator valve can be recycled without the need for removing foreign substances by passing through a filter mesh member 24 mentioned later. Moreover, the drain oil of the regulator valve is greater in the flow quantity, faster in the flow speed, and higher in the oil pressure than the drain oils of the spool valve and the other pressure regulating valve. Therefore, the drain oil of the regulator valve can be used efficiently to produce an oil flow in an upper space S1 in the oil strainer, as mentioned later. From these reasons, the discharge hole 16 is arranged to introduce the drain oil of the regulator valve into the upper space S1.

The circumferential wall 11 of body member 10 includes a plurality of bolt boss portions 12 each formed with a bolt hole 13. Bolt boss portions 12 are formed integrally in circumferential wall 11, arranged at appropriate intervals in a circumferential direction, and connected by circumferential wall portions each extending circumferentially between two adjacent bolt boss portions 12. End surfaces (lower end surfaces) 11a and 12a of the circumferential wall portions and bolt boss portions 12 are flat and flush with one another so as to form a continuous flat end surface extending circumferentially in the form of a closed loop. The cover member 20 includes a flange portion 22 extending circumferentially in conformity with the shape of the continuous flat end surface (11a, 12a) of the body member 10. The flange portion 22 of cover member 20 are placed on the continuous flat end surface (11a, 12a) of the body member 10, and joined by a plurality of bolts (not shown).

As shown in FIG. 1 and FIGS. 3A and 3B, cover member 20 is shaped like a hat, and includes a bulging portion or center portion 21 bulging in the first (downward) direction toward the oil pan 30, and the flange portion 22 surrounding the bulging portion 21 over the full circumference like a brim of a hat.

The flange portion 22 of cover member 20 is so shaped that flange portion 22 can be placed fittingly on the circumferential wall 11 of body member 10. Flange portion 22 is formed with a plurality of bolt holes 22a each located at a position which can be aligned with a corresponding one of the bolt holes 13 of circumferential wall 11 of body member 10.

The bulging portion 21 includes a projecting portion 23 formed with an oil suction hole 23a having an approximately rectangular shape in the plan view of FIG. 2. The suction hole 23a serves as an inlet port of the oil strainer 1, and the oil strainer 1 includes the inlet port (23a) to be connected with an oil pan's side and the outlet port (15) to be connected with the oil pump's side. As shown in FIG. 3B, the projecting portion 23 projects in the first (downward direction) toward (the bottom of) the oil pan 30 shown by two-dot chain line (away from body member 10). In the assembled state, the oil strainer 1 is disposed in oil pan 30 so that at least the projecting portion 23 is submerged in the oil OL stored in oil pan 30. As shown in FIG. 2, the suction hole 23a is located in a central region while the communication hole 15 and discharge hole 16 are located in a peripheral region near circumferential wall 1.

As shown in FIGS. 3A and 3B, between the lower body member 10 and cover member 20, there is provided the filter mesh member 24 for filtration of foreign substances. The inside space S between body member 10 and cover member 20, surrounded by circumferential wall 11 is divided by the filter mesh member 24 into a first (upper) space S1 and a second (lower) space S2. The oil can flow through filter mesh member 24, from the second space S2 to the first space S2 and vice versa.

In this example, the oil discharged through discharge hole 16 into the first (upper) space S1 is the drain oil of the regulator valve. However, the pressure is lower than the pressure in the second (lower) chamber S2, and hence the possibility of a downward flow from upper chamber S1 to lower chamber S2 is low. Moreover, the filter mesh member 24 employs mesh of a small opening. Therefore, at the time of operation of the oil pump, the oil generally flows from lower space S2 to upper space S1, and the oil hardly moves from upper space S1 to lower space S2.

In the installed state in which the automatic transmission equipped with the oil strainer 1 is mounted in a vehicle, the second space S2 is on the lower side near the ground and the first space S1 is on the upper side above the second space S2. Therefore, air bubbles in the oil gather and tend to form an accumulation of air in the first (upper) space S1, near the base wall or horizontally extending bottom wall of body member 10.

A partition wall 17 is formed in the first (upper) space S1 surrounded by circumferential wall 11. As shown in FIG. 2, the partition wall 17 extends so as to separate a portion in which communication hole 15 is formed and a portion in which discharge hole 16 is formed. Partition wall 17 projects from circumferential wall 11 (from one of the bolt boss portions 12 in the illustrated example). Partition wall 17, in this example, extends so as to intersect an imaginary straight line IM1 connecting a center or central portion C2 of communication hole 15 and a center or central portion C3 of discharge hole 16 and to obstruct a direct or short-cut path between communication hole 15 and discharge hole 16.

Partition wall 17 is formed integrally in body member 10. In this example, the partition wall 17, the circumferential wall 11 and the base wall are integral parts of the jointless, integral body member 10. The communication hole 15 is located adjacent to a first bolt boss portion 12A, and the discharge hole 16 is located adjacent to a second bolt boss portion 12B. Partition wall 17 extends from a third bolt boss portion 12C located circumferentially between the first and second bolt boss portions 12A and 12B. The first, third and second bolt boss portions 12A, 12C and 12B are three consecutive bolt boss portions of the bolt boss portions 12 which are 12 in number in the example of FIG. 2. The third bolt boss portion 12C is located between the first and second bolt bosses 12A and 12B. From the third bolt boss portion 12C, a first circumferential wall portion extends circumferentially to the first bolt boss portion 12A in the counterclockwise direction as viewed in FIG. 2, and a second circumferential wall portion extends circumferentially to the second bolt boss portion 12B in the clockwise direction. In the example shown in FIG. 2, the partition wall 17 is straight and extends rectilinearly from the inner side of the third bolt boss portion 12C.

Partition wall 17 extends in the first (downward) direction from a (lower) wall surface of the base wall of body member 10, to a (lower) wall end which is located near the filter mesh member 24. As shown in FIG. 3A, the height "h" of partition wall 17 is slightly smaller than the height of circumferential wall 11 as measured from the (lower) wall surface of the base wall of body member 10, and slightly smaller than the distance between the filter mesh member 24 and the (lower) wall surface of the base wall of body member 10. In this example, the filter mesh member 24 and the (lower) wall surface of the base wall of body member 10 are flat, and extend in parallel to each other in the horizontal direction as viewed in FIG. 3A. Partition wall 17 extends in the first (upper) space S1 and thereby forms an oil passage 18 extending from a first passage end portion in which discharge hole 16 is formed, to a second passage end portion in which communication hole 15 is formed, in the U-shaped form for guiding the oil to flow along the circumferential wall 11.

When the oil pump is driven, the oil discharged through discharge hole 16 into the oil passage 18 in the first (upper) space S1 flows along the circumferential wall 11 from the upstream first passage end portion formed with discharge port 16, toward the downstream second passage end portion in which communication hole 15 is opened, by the sucking force of the oil pump.

Partition wall 17 extends from a base (wall) end connected with circumferential wall 11, to a forward (wall) end 17a not connected with the circumferential wall 11. In this example, the base end of partition wall 17 is connected with the bolt boss portion 12C of circumferential wall 11. As viewed in the plan view of FIG. 2, the partition wall 17 extends up to a position lying on a second imaginary straight line IM2 extending through a center or central portion C1 of suction hole 23a of cover member 20, in parallel to the first imaginary straight line IM1 connecting the center or central portion C2 of communication hole 15 and the central position or center C3 of discharge hole 16, and the forward end 17a of partition wall 17 is located at this position lying on the second imaginary straight line IM2. The oil passage 18 formed by partition wall 17 and circumferential wall 11 includes a first region or segment 18a extending from the first passage end portion in which discharge hole 16 is opened, a second region or segment 18b extending from the second passage end portion in which communication hole 15 is opened, and a third region or segment connecting the first and second regions 18a and 18b so as to form the continuous U-shaped oil passage 18. In the first region 18a, the oil tends to flow in the (clockwise) direction as shown by an arrow in FIG. 2 from discharge hole 16 located near the base end of partition wall 17, toward the forward end 17a of partition wall 17. In the second region 18b, on the other hand, the oil tends to flow in the opposite direction from the forward end 17a toward the communication hole 15 located near the base end of partition wall 17.

As shown in FIG. 2 and FIGS. 3A and 3B, the partition wall 17 separates the first and second regions 18a and 18b from each other so that the width W1 of first region 18a on the upstream side is smaller than the width W2 of second region 18b on the downstream side. The width W2 of the second region 18b between partition wall 17 and circumferential wall 11 is made gradually greater from the downstream end portion adjacent to the base end of partition wall 17 toward the upstream end portion of second region 18b adjacent to the forward end 17a of partition wall 17. That it, the second region 18b is tapered toward the communication hole 15. The first region 18a of the oil passage 18 extends with a substantially constant width, and becomes narrower slightly at the downstream end near the forward end 17a of partition wall 17, in order to ensure the flow speed of the oil toward the second region 18b. The width W1 of first region 18a is approximately constant except for the downstream end portion adjacent to the forward end 17a of partition wall 17.

Partition wall 17 is formed so that the cross section area of first region or segment 18a of oil passage 18 is greater than the cross sectional area of discharge hole 16, and the cross section area of the narrowest portion of first region 18a is greater than the cross sectional area of discharge hole 16. Therefore, in the case of oil passage 18 shown in FIG. 2, the spacing or width W1a of second region 18a between the forward end 17a of partition wall 17 and the circumferential wall is set greater than the cross sectional area of discharge hole 16, in order to prevent an increase of the pressure loss as compared to a conventional oil strainer, and to prevent a decrease of the speed of the oil flow in the oil strainer.

The width W2 of second region 18b of oil passage 18 is greater than the width W3 of opening of the suction hole 23a, as shown in FIG. 2 and FIG. 3B. As shown in the plan view of FIG. 2, the first region 18a is located on the first (right) side of partition wall 17 whereas the suction hole 23a and the second region 18b are located on the second (left) side of partition wall 17. On the second side of partition wall 17 as viewed in the plan view of FIG. 2, the suction hole 23a of cover member 20 is located at the position closer to the circumferential wall 11 (one of the bolt boss portions 12) and remoter from partition wall 11. Accordingly, between the forward end 17a of partition wall 17 and the circumferential wall 11 on the second (left) side, there are formed a first (half) subregion and a second (half) subregion in which the suction hole 23a is located. In the plan view of FIG. 2, the first (half) subregion is located between the partition wall 17 and the second (half) subregion in which the suction hole 23a is located. Thus, the oil can flow through the first (half) subregion between the partition wall 11 and the suction hole 23a, toward communication hole 15.

With this arrangement, the oil flowing from first region 18a to second region 18b can flow along the partition wall 17 with a relatively high speed through the first (half) subregion up to communication hole 15 without being disturbed largely by the flow of the oil sucked through the suction hole 23a into the oil strainer. The oil flowing near the circumferential wall 11 with a relatively low speed away from partition wall 17 is pulled by the faster flow of the oil from suction hole 23a toward communication hole 15 and impelled to the communication hole 15 together.

In the thus-constructed oil strainer 1, the oil in the oil pan 30 is sucked into the oil strainer 1 through oil suction hole 23a (strainer inlet port) by the operation of the oil pump (not shown). Then, the oil is sucked into the oil pump through communication hole 15 (strainer outlet port), and supplied to the control valve body. The oil drained from the regulator valve is discharged into the first (upper) space S1 of oil strainer 1 through discharge hole 16.

The oil discharged into oil strainer 1 through discharge hole 16 is drawn toward communication hole 15 by the sucking force of the oil pump. Accordingly, the oil flows through the oil passage 18 defined in the first (upper) space S1 by partition wall 17 and circumferential wall 11 to communication hole 15, instead of flowing straight through a direct short-cut path from discharge hole 16 to communication hole 15. In the automatic transmission, the first (upper) space S1 of oil strainer 1 is celled by the horizontally extending base wall of body member 10, and located in the upper portion where air bubbles tend to gather to form an accumulation of air. However, the first (upper) space S1 of oil strainer 1 according to this embodiment is designed to promote a flow of the oil entirely in the first (upper) space S1 and to prevent formation of a stagnant portion, so that it is possible to reduce the possibility of accumulation of air in the oil strainer.

As explained above, the oil strainer 1 in the illustrated example of the embodiment comprises a body member (10) and a cover member (20). The body member (such as the lower body member 10) is adapted to form (a lower part of) a valve body having therein a pressure regulating valve to adjust an outlet pressure of an oil pump to a predetermined level. The body member (10) includes a circumferential wall (11) projecting in a first (downward) direction (or depth direction) toward (a bottom of) an oil pan (30). The cover member (20) is a member covering an inside space (S) surrounded by the circumferential wall, and including a suction hole (23a) to suck an oil from the oil pan (30). The oil strainer further comprises a communication hole (15) opened into the inside space surrounded by the circumferential wall and adapted to convey the oil to an inlet side of the oil pump, a discharge hole (16) opened into the inside space surrounded by the circumferential wall, and adapted to receive the oil discharged from the pressure regulating valve, and a partition wall extending from the circumferential wall, and separating the communication hole and the discharge hole from each other. Preferably, each of the communication hole and the discharge hole is located adjacent to the circumferential wall, and the partition wall extends so as to intersect a direct straight path between the communication hole and the discharge hole which are located close to each other in a circumferential direction along the circumferential wall in the inside space.

In the oil strainer (1) having the thus-constructed air accumulation preventing structure, the oil discharged from the discharge hole (16) into the inside space (S) of the oil strainer flows in the first (upper) space (S1) of the oil strainer so as to form a smooth stream of the oil toward the communication hole (15) on the opposite side of the partition wall (17). The oil is guided to flow smoothly in the first (upper) space (S1) in such a manner as to impede or prevent accumulation of air. Therefore, the oil strainer can prevent abnormal noise in the oil pump due to a sucked accumulation of air, and prevent shock due to a decrease of the oil pressure used for engagement of an engagement device.

In the case of the arrangement in which the discharge hole (16) is adapted to receive the drain oil of the regulator valve, the oil containing a smaller amount of foreign substances is used to form a smooth oil flow in the first (upper) space (S1) of the oil strainer. The regulator valve is a valve located at the most upstream position closest to the outlet side of the oil pump in the control valve body. Therefore, the drain oil of the regulator valve is clean and the amount of foreign objects is very small, as compared to the drain oils of the other pressure regulating valve and the spool valve. Moreover, the drain oil of the regulator valve is sufficient in the quantity, the flow speed and the oil pressure, for forming a smooth oil flow in the oil strainer, as compared to the drain oils of the spool valve and the other pressure regulating valve.

Furthermore, the oil strainer may be constructed in the following manner. The partition wall (17) extends from a base wall end connected with the circumferential wall (11) (at 12C), to a forward wall end (17a) not connected with the circumferential wall, in the inside space (S, S1) surrounded by the circumferential wall (11) and thereby forms an oil passage (18) extending from an upstream end portion which is adjacent to the base wall end of the partition wall (17) on a first side of the partition wall (17) and which is formed with the discharge hole (16) to a downstream end portion which is adjacent to the base wall end of the partition wall on a second side of the partition wall (17) and which is formed with the communication hole (15), through an intermediate portion in which the suction hole (23a) is located in a plan view of the oil strainer such as the view of FIG. 2. With this construction, the oil strainer can prevent accumulation of air securely by forming a smooth oil flow in the whole of the first (upper) space (S1) of the oil strainer.

Furthermore, the oil strainer may be constructed in the following manner. The partition wall (17) extends from the circumferential wall (11) to a position lying on a second is imaginary straight line (IM2) extending through a center or center line of the suction hole (23a), in parallel to a first imaginary straight line (IM1) connecting a center of the communication hole (15) and a center of the discharge hole (16) in a plan view of the oil strainer as viewed from below on an oil pan's side. In this case, the oil introduced from the discharge hole (16) into the first (upper) space (S1) in the oil strainer flows in a U-shaped course defined by the partition wall (17) along the circumferential wall 11. Therefore, the oil flows on the first (right) side of the partition wall (17) up to a remote region remote from the discharge hole (16) and the communication hole (15), and then flows toward the downstream region in which the communication hole (15) is located, from the remote region through the intermediate region which contains the position of the suction hole (23a) and which is located between the downstream region and the remote region on the second (left) side of the partition wall (17). Thus, the oil can flow smoothly over the entirety of the first (upper) space (S1) in the oil strainer without stagnation, and thereby prevent accumulation of air effectively.

Moreover, the partition wall (17) may be formed so that the width (W1) of the first region (18a) of the oil passage (18) is smaller than the width (W2) of the second region (18b) on the opposite side of the partition wall (17), and the cross section area of the first region (18a) is greater than the cross sectional area of the discharge hole (16) (the cross section area of the narrowest portion of the first region is greater than the cross sectional area of the discharge hole). Therefore, the oil strainer can prevent an increase of the pressure loss, and prevent a decrease of the speed of the oil flow in the oil strainer.

On the second (left) side of the partition wall (17) as viewed in the plan view from below on the oil pan's side (like FIG. 2), the suction hole (23a) of the cover member (20) is located at the position closer to the circumferential wall 11 and remoter from partition wall 11. Accordingly, between the partition wall (17) and the circumferential wall (11) on the second (left) side, there are formed a first (half) subregion in which the suction hole is not located, and a second (half) subregion in which the suction hole (23a) is located. In the plan view, the first (half) subregion is located between the partition wall (17) and the second (half) subregion in which the suction hole 23a is located. Thus, the oil can flow smoothly through the first (half) subregion between the partition wall 11 and the suction hole 23a, toward communication hole 15. Therefore, the oil can flow along the partition wall (17) through the first (half) subregion up to communication hole 15 without being disturbed largely by the flow of the oil sucked through the suction hole (23a) into the oil strainer.

The partition wall (17) may be an integral part of the body member (10). In this case, the partition wall (17) can be formed easily when the body member (10) is formed by casting, without the need for an additional operation for forming the partition wall, and without increasing the manufacturing cost.

In the illustrated example, the partition wall 17 is extended rectilinearly to the forward end 17a located at the position on the imaginary straight line IM2 as shown in FIG. 2. However, it is optional to determine the shape and the extent of the partition wall 17 in various other modes in the range appropriate for producing an oil flow even in the remote region which is a region remote from the communication hole 15 beyond the position of the suction hole 23a and which is liable to incur stagnation. For example, the partition wall 17 may be formed so that the partition wall 17 extends beyond an imaginary curved line IM3 shown in FIG. 2. The imaginary curved line IM3 is a circular arc extending around the center or central portion C2 of the communication hole 15, and inscribing the suction hole 23a in the plan view so that the imaginary curved line IM3 passing through the remotest point of the boundary of the suction hole 23a remotest from the center C2. In this case, the forward end 17a of the partition wall 17 is located on the remote side (the lower side in FIG. 2) of the imaginary curved line IM3 remote from the discharge hole 16 and communication hole 15. The spacing or width between the partition wall 17 and the circumferential wall 11 in the first region 18a is smaller than the spacing or width between the partition wall 17 and the circumferential wall 11 in the second region 18b. The flow passage cross sectional size of the first region 18a at the position of the forward end 17a is approximately equal to or slightly greater than the cross sectional size of the discharge hole 16. In this arrangement, the partition wall 17 can promote a smooth oil flow almost entirely in the first (upper) space S1. The partition wall 17 may be in the form of a straight flat wall, or a curved wall, or a wall having a bend.

According to the illustrated embodiment of the present invention, an oil strainer has a basic construction which comprises: a first member such as a body member (10) and a second member such as a cover member (20) to define an inside space of the oil strainer. The first member includes a circumferential wall projecting in a first direction toward the second member. The second member covers the inside space surrounded by the circumferential wall, and includes a suction hole (or inlet port of the strainer) adapted to suck an oil from an oil pan. The first member further includes a communication hole (or outlet port of the strainer) opened into the inside space surrounded by the circumferential wall and adapted to supply the oil to an oil pump, a discharge hole opened into the inside space surrounded by the circumferential wall, and adapted to receive the oil drained from an oil pressure control circuit, and a partition wall extending from the circumferential wall, and separating the communication hole and the discharge hole.

The oil strainer according to the illustrated embodiment may further include the following feature in addition to the features of the above-mentioned basic construction. The partition wall (17) of the first (body) member (10) extends in the inside space surrounded by the circumferential wall from a base wall end connected with the circumferential wall (with a bolt boss portion (12C) of the circumferential wall (11), for example), to a forward wall end (17a) so as to divide the inside space into a first region (18a) extending from a first (upstream) end portion which is located adjacent to the base wall end of the partition wall and which is formed with the discharge hole (16), to a second (downstream) end portion adjacent to the forward wall end, a second region (18b) extending from a first (upstream) end portion adjacent to the forward wall end to a second (downstream) end portion which is located adjacent to the base wall end of the partition wall and which is formed with the communication hole (15), and a connecting (remote) region connecting the second (downstream) end portion of the first region and the first (upstream) end portion of the second region so as to form an oil passage (18) (such as a U-shaped passage) extending from the first (upstream) end portion of the first region to the second (downstream) end portion of the second region through an intermediate portion to which the suction hole is opened.

This application is based on a prior Japanese Patent Application No. 2009-268402 filed on Nov. 26, 2009. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An oil strainer comprising:
a body member which is adapted to form a valve body provided with a pressure regulating valve to adjust an outlet pressure of an oil pump to a predetermined level, and including a circumferential wall projecting in a first direction toward an oil pan;
a cover member covering an inside space surrounded by the circumferential wall, and including a suction hole to suck an oil from the oil pan;
the body member further including:
a communication hole opened into the inside space surrounded by the circumferential wall and adapted to lead to an inlet passage of the oil pump,
a discharge hole opened into the inside space surrounded by the circumferential wall, and adapted to receive the oil discharged from the pressure regulating valve, and a partition wall extending from the circumferential wall and separating the communication hole and the discharge hole, wherein the partition wall extends from a base wall end connected with the circumferential wall to a forward wall end not connected with the circumferential wall, in the inside space surrounded by the circumferential wall and thereby forms an oil passage extending from an upstream end portion which is adjacent to the base wall end of the partition wall on a first side of the partition wall and which is formed with the discharge hole, to a downstream end portion which is adjacent to the base wall end of the partition wall on a second side opposite to the first side and which is formed with the communication hole, through an intermediate portion in which the suction hole is opened in a plan view of the oil strainer.

2. The oil strainer as claimed in claim 1, wherein each of the communication hole and the discharge hole is located adjacent to the circumferential wall, and the partition wall extends so as to intersect a direct straight path between the communication hole and the discharge hole which are located close to each other along the circumferential wall in the inside space.

3. An oil strainer comprising:
a body member which is adapted to form a valve body provided with a pressure regulating valve to adjust an outlet pressure of an oil pump to a predetermined level and which includes a circumferential wall projecting in a first direction toward an oil pan, and
a cover member covering an inside space surrounded by the circumferential wall, and including a suction hole to suck an oil from the oil pan;
the body member further including,
a communication hole opened into the inside space surrounded by the circumferential wall and adapted to lead to an inlet passage of the oil pump,
a discharge hole opened into the inside space surrounded by the circumferential wall, and adapted to receive the oil discharged from the pressure regulating valve, and
a partition wall extending from the circumferential wall and separating the communication hole and the discharge hole,
wherein the partition wall extends from the circumferential wall to a position at which the partition wall intersects a second imaginary straight line extending through a center of the suction hole, in parallel to a first imaginary straight line connecting a center of the communication hole and a center of the discharge hole in a plan view of the oil strainer as viewed from an oil pan's side.

4. The oil strainer as claimed in claim 1, wherein the partition wall is an integral part of the body member.

5. An oil strainer comprising:
a body member which is adapted to form a valve body provided with a pressure regulating valve to adjust an outlet pressure of an oil pump to a predetermined level, and which includes a circumferential wall projecting in a first direction toward an oil pan; and
a cover member covering an inside space surrounded by the circumferential wall, and including a suction hole to suck an oil from the oil pan;
the body member further including,
a communication hole opened into the inside space surrounded by the circumferential wall and adapted to lead to an inlet passage of the oil pump,
a discharge hole opened into the inside space surrounded by the circumferential wall, and adapted to receive the oil discharged from the pressure regulating valve, and
a partition wall extending from the circumferential wall, and separating the communication hole and the discharge hole,
wherein the partition wall of the body member extends in the inside space surrounded by the circumferential wall from a base wall end connected with the circumferential wall to a forward wall end so as to divide the inside space into a first region extending from a first end portion which is located adjacent to the base wall end of the partition wall on a first side of the partition wall and which is formed with the discharge hole, to a second end portion adjacent to the forward wall end of the partition wall on the first side of the partition wall, a second region extending from a first end portion adjacent to the forward wall end of the partition wall on a second side of the partition wall to a second end portion which is located adjacent to the base wall end of the partition wall on the second side of the partition wall and which is formed with the communication hole, and a connecting region connecting the second end portion of the first region and the first end portion of the second region to form an oil passage extending from the first end portion of the first region to the second end portion of the second region through an intermediate portion toward which the suction hole is opened.

6. The oil strainer as claimed in claim 5, wherein the suction hole of the cover member is directed toward the intermediate portion so that a center line of the suction hole passes through the intermediate portion between the first end portion of the first region and the second end portion of the second region.

7. The oil strainer as claimed in claim 5, wherein the second region of the oil passage is wider than the first region.

8. The oil strainer as claimed in claim 5, wherein the second region is tapered from the first end portion adjacent to the forward wall end to the second end portion which is located adjacent to the base wall end of the partition wall on the second side of the partition wall and which is formed with the communication hole so that a width of the second region becomes gradually smaller from the first end portion to the second end portion of the second region.

9. The oil strainer as claimed in claim 5, wherein the suction hole of the cover member is located at a position closer to the circumferential wall so that the distance from the partition wall to the position of the suction hole is greater than the distance from the circumferential wall to the position of the suction hole.

10. The oil strainer as claimed in claim 1, wherein the oil strainer further comprises a filter mesh member disposed between the circumferential wall of the body member and the cover member, and the partition wall projects toward the filter mesh member and has a height slightly smaller than a height of the circumferential wall.

* * * * *